United States Patent [19]

Jakszt

[11] 3,875,466
[45] Apr. 1, 1975

[54] VOLTAGE OVERLOAD ARRESTER FOR HIGH-VOLTAGE SWITCHING SYSTEM

[75] Inventor: Werner Jakszt, Heilmannring, Germany

[73] Assignee: Siemens Aktiengesellschaft, Munich, Germany

[22] Filed: Sept. 20, 1973

[21] Appl. No.: 399,354

[30] Foreign Application Priority Data
Sept. 27, 1972 Germany............................ 2247996

[52] U.S. Cl..................................... 317/62, 317/71
[51] Int. Cl. .............................................. H02h 9/06
[58] Field of Search ......... 317/18 R, 62, 71, 58, 60;
200/148 B

[56] References Cited
UNITED STATES PATENTS

| | | | |
|---|---|---|---|
| 2,237,426 | 4/1971 | Grassnick et al. ................ | 317/62 X |
| 3,323,018 | 5/1967 | Roth ................................. | 317/18 R |
| 3,566,061 | 2/1971 | Bernatt ............................ | 317/71 X |
| 3,777,218 | 12/1973 | Kessler ............................ | 317/71 |

*Primary Examiner*—James D. Trammell
*Attorney, Agent, or Firm*—Kenyon & Kenyon Reilly Carr & Chapin

[57] ABSTRACT

An improved voltage overload arrester for high-voltage switching systems of the type including a switching housing containing a gaseous insulating medium, a voltage overload arrester housing also containing a gaseous insulating medium, a voltage overload arrester disposed in the arrester housing, and monitoring device coupled between a ground terminal of the arrester and ground potential. The monitoring device monitors the frequency of response of the arrester, and provides a measure of the magnitude of the arrester discharge current. The improvement comprises a feedthrough coupling member, coupled to the ground terminal of the arrester and to the monitoring device, which extends outwardly through the voltage overload arrester housing and includes gas-tight sealing means disposed between the coupling member and the arrester housing for preventing the escape of gases contained therein. In one embodiment of the invention, the coupling member and the monitoring device are formed as an integral structural unit, and the monitoring device is disposed on the outside surface of the arrester housing. In another embodiment of the invention, the monitoring device is spaced apart from the housing and the coupling member, and is coupled to the latter by an electrical conductor.

4 Claims, 4 Drawing Figures

VOLTAGE OVERLOAD ARRESTER FOR HIGH-VOLTAGE SWITCHING SYSTEM

BACKGROUND OF THE INVENTION

1. Field Of The Invention

The invention relates generally to high-voltage switching systems of the type having metallic switching housings containing a gaseous insulating medium, and in particular, to an improved voltage overload arresting apparatus for such switching systems.

2. Description Of The Prior Art

Monitoring devices including spark gaps and/or response counters are generally utilized in high-voltage switching installations to measure the frequency of response of the overload arresting system thereof and provide an approximate measure of the magnitude of the voltage overloads and current surges which activate the arrester. Conventional high-voltage switching system installations generally position monitoring devices in an easily accessible place adjacent a support member, which is constructed of electrical insulation material, provided for mounting the arrester. In installations utilizing metallic switching housings containing a gaseous insulating medium, positioning and connection of the monitoring device with respect to the voltage overload arrester is considerably more difficult than in other type systems, particularly if the arrester is positioned in the switching system housing in the same manner as that described in German Auglegeschrift 1,241,514.

SUMMARY OF THE INVENTION

It is therefore an object of the invention to provide an improved voltage overload arrester for a high-voltage switching system which overcomes the above-mentioned disadvantages of heretofore known switching systems.

This object is achieved in a high-voltage switching system of the type including a switching housing containing a gaseous insulating medium, a voltage overload arrester housing also containing a gaseous insulating medium, a voltage overload arrester disposed in the arrester housing, and a monitoring device coupled between the ground terminal of the overload arrester and ground potential for monitoring the response of the arrester to voltage overloads and providing a measure of the magnitude of the discharge current flowing therethrough. The improvement comprises the provision of a feedthrough coupling member, coupled to the ground terminal of the arrester and to the monitoring device, and extending outwardly through the voltage overload arrester housing. The monitoring device may be disposed either spaced apart from or on the outside surface of the arrester housing so as to be easily accessible from the exterior of the switching system. The coupling member permits the disposition of the monitoring device, which may include a spark gap and/or a response counter, outside the arrester housing where it is readily accessible for determination of the desired information and maintenance of the monitoring device.

DETAILED DESCRIPTION

Figures 1, 2:
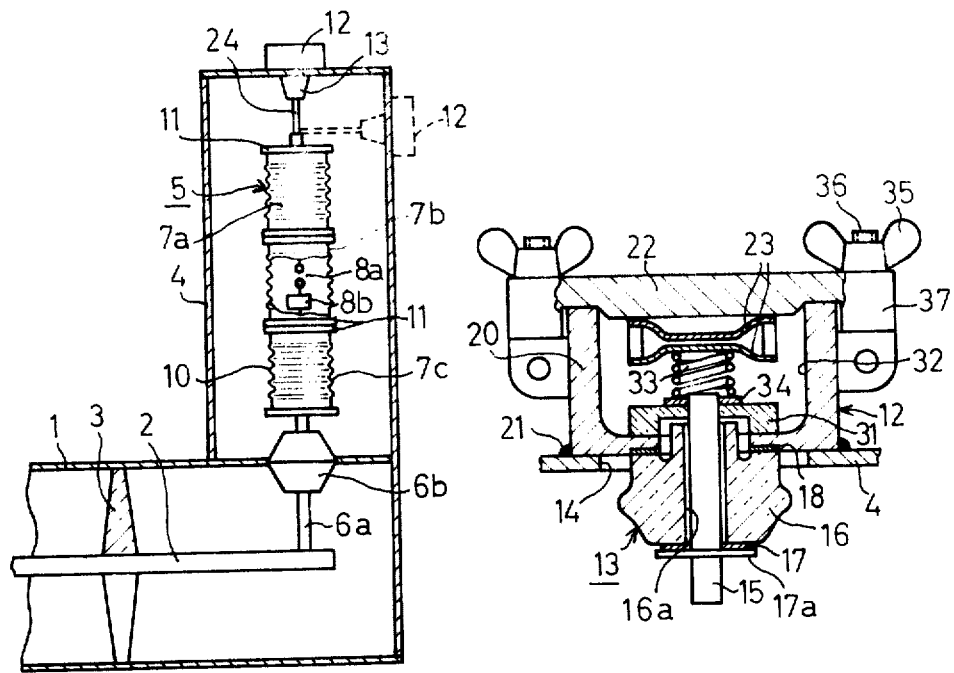
FIG. 1 is a cross-sectional view of an improved voltage overload arrester constructed according to the invention.
FIG. 2 is a partial, cross-sectional view of the feedthrough coupling member and one embodiment of a monitoring device for the improved voltage overload arrester of the invention.

Referring now to the drawings, specifically FIG. 1, there is shown a voltage overload arrester 5 disposed in a metallic arrester housing 4 which is mounted on a metallic switching housing 1 of a high-voltage switching installation. The arrester comprises three separate, interconnected arrester units 7a, 7b, and 7c, each consisting of a cylindrical, gas-tight housing 10 constructed of electrical insulation material, such as, for example, porcelain, and having annular coupling flanges 11 at each axial end thereof. Each arrester unit includes spark gaps 8a and voltage dependent discharge resistors 8b (shown schematically in unit 7b) of conventional type, coupled in series. The arrester is coupled to a bus bar 2, which is mounted on a support member 3 in housing 1 constructed of electrical insulation material, by means of an electrical conductor 6a and a feedthrough coupling member 6b which includes a gas-tight seal. Both housing 1 and 4 contain a gaseous insulating medium of high dielectric strength, such as, for example, sulfur hexafluoride. Each of the arrester units 7a, 7b and 7c have their housings 10 filled with another gaseous insulating medium having a different dielectric strength which is chosen for its suitability as a gaseous atmosphere for the operation of the spark gaps contained therein. Nitrogen gas is particularly suitable and is preferred. It should be noted that many different structural arrangements of the arrester are possible, and the specific embodiments chosen for illustration are merely exemplary. For example, the spark gaps and discharge resistors may be disposed within housing 4 without a separate housing and exposed to the gaseous insulating medium contained therein. Alternatively, spark gaps 8a and resistors 8b may be disposed in separate housing containing different gaseous insulating mediums. For example, spark gaps 8a may be disposed in a housing filled with nitrogen gas, which, as previously noted, is a particularly suitable atmosphere for the operation of the spark gaps, and resistors 8b may be disposed in another housing filled with an electronegative gaseous insulating medium, which is preferable as an atmosphere for resistor operation since such a gaseous insulating medium suppresses the arc-over caused by current surges and increases the safety of operation of the system.

A monitoring device, illustrated as spark gap 12, is disposed on the exterior surface of housing 4 for monitoring the response of arrester 5 and providing a measure of the magnitude of the voltage overloads and discharge current surges flowing through the arrester. The spark gap is coupled to the ground terminal conductor 24 of arrester 5 by means of a feedthrough coupling member 13 which extends outwardly through housing 4. As shown by the dotted lines in FIG. 1, the coupling member and spark gap may be disposed in the side wall of housing 4, if desired.

The structural details of feedthrough coupling member 13 and spark gap 12 are shown in detail in FIG. 2.

Housing 4 includes an annular aperture 14 through which coupling member 13 extends. The coupling member comprises an electrical conductor 15, which is coupled to terminal conductor 24 of arrester 5, surrounded by a body member 16 constructed of electrical insulation material. Member 16 includes a centrally disposed elongated aperture 16a extending axially therethrough in which conductor 15 is disposed. An annular gasket 17 is disposed about conductor 15 and engages the lower end of member 16. The gasket seals aperture 16a and prevents the escape of the gaseous insulating medium contained within housing 4 therethrough. Fastening member 17a engages gasket 17 and conductor 15 and ensures the maintenance of a gastight seal around aperture 16a.

Spark gap 12 comprises in annular housing 20 which is disposed on the outer surface of housing 4 over aperture 14. Another annular gasket 18 is disposed between housing 20 and member 16 to provide a gas-tight seal therebetween and prevent the escape of the gaseous insulating medium contained in housing 4 into spark gap 12 through aperture 14. A gas-tight welded seam 21 is also disposed about the base of housing 20 where it meets housing 4 and joins housing 20 to the outer surface thereof to prevent the escape of gas from housing 4 into the atmosphere. Seam 21 and gaskets 17 and 18 in combination form a gas-tight sealing means for the coupling member. Conductor 15 is secured at one end of an annular, non-conductive anchor member 31 which engages the inside surface 32 of housing 20. A conductive coil spring 33 is interdisposed between an annular metallic washer 34 disposed about conductor 15 on the surface of member 31 and the spark gap electrodes 23. Spring 33 exerts a vertically upwardly directed force on electrodes 23 so that the electrodes engage a cover 22 for the spark gap housing. The cover is secured on housing 20 by means of suitable fastening means, such as the wing-nuts 35 and bolts 36, illustrated in the drawings, the latter of which are secured to housing 20 and extend upwardly through annular flanges 37 provided on cover 22. The cover is removable and permits electrodes 23 to be observed from the exterior of housing 4.

It thus can be seen from FIG. 2 that feedthrough coupling member 13 and spark gap 12 comprise a unitary structural unit which is coupled by a gas-tight seal to the housing enclosing the voltage overload arrester. None of the known monitoring spark gap devices used heretofore in high-voltage switching systems have a gas-tight feedthrough coupling structure which is suitable for containing insulating gases, particularly sulfur hexafluoride. In operation, discharge currents flowing through voltage overload arrester 5 are conducted through each arrester unit, terminal conductor 24, conductor 15, washer 34, and spring 33, and discharge acorss electrodes 23. Spark gas housing 20 is grounded by its contact with arrester housing 4 which is coupled to ground potential.

Figures 3, 4:
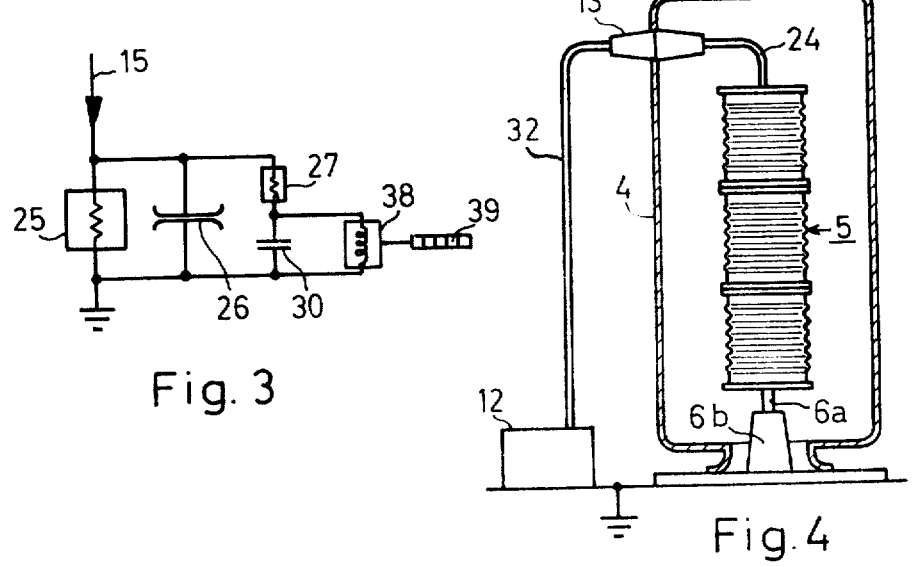
FIG. 3 is an electrical, schematic diagram of another embodiment of a monitoring device for use with the improved overload arrester of the invention.
FIG. 4 is a cross-sectional view of another embodiment of an improved voltage overload arrester constructed according to the invention.

FIG. 3 is an electrical schematic diagram of monitoring device comprising a spark gap and a response counter in combination. The monitoring device illustrated comprises a resistor 25, connected to conductor 15, which is coupled in parallel to spark gap electrodes 26. Another resistor 27, and a capacitor 30 coupled in series thereto, are connected in parallel to spark gap electrodes 26. A coil winding 38 of an electromagnetic counter 39 is shunted across capacitor 30. In operation, discharge currents flow through conductor 15 and cause a voltage drop acorss resistor 25. This potential appears across electrodes 26 and causes a current discharge whose magnitude is a measure of the discharge current of the overload arrester. The tracks caused by the current arcs across the electrodes are an approximate indication of both the magnitude of the current surges caused by voltage overloads, and the subsequent current flow. The potential which appears across resistor 25 also causes the charging of capacitor 30 by resistor 27. Coil 38 is magnetized in response to the charging of the capacitor, and activates counter 39, which records the response of the overload arrester to current surges.

Another embodiment of the overload arrester of the invention is illustrated in FIG. 4. In this embodiment of the invention, spark gap 12 is spaced apart remote from both coupling member 13 and arrester housing 4, and is coupled to member 13 by means of an elongated conductor 32. Coupling member 13 is secured in a side wall of housing 4, and includes suitable gastight seals disposed about the member and conductor 15 to prevent the escape of gas from housing 4. An arrangement similar to seam 21 and gaskets 17 and 18 may be used. The housing of spark gap 12 is grounded to effect proper operation of the arrester and monitoring device by coupling the spark gap housing to arrester housing 4 or to another suitable ground. The switching system housing 1 has not been illustrated in FIG. 4 for the sake of simplicity. The operation of the monitoring device and arresting mechanism of this embodiment is the same as the previously described embodiment of the invention.

While there have been disclosed herein what are considered at a present to be preferred embodiments of the invention, it will be understood by those persons skilled in the art that many changes and modifications may be made thereunto. It is therefore intended in the appended claims to include all such changes and modifications as fall within the true spirit and scope of the invention.

What is claimed is:

1. In a high-voltage switching system, of the type including a switching housing containing a gaseous insulating medium, a voltage overload arrester housing also containing a gaseous insulating medium, a voltage overload arrester disposed in the arrester housing, and a monitoring device, coupled between a ground terminal of the overload arrester and ground potential, for monitoring the response of the arrester and providing a measure of the magnitude of the discharge currents flowing therethrough, the improvement comprising an electrically conductive feedthrough coupling member, coupled to said ground terminal of said arrester and to said monitoring device, and extending outwardly through said arrester housing, said feedthrough coupling member comprising an electrical conductor coupled to said ground terminal of said overload arrester, a body member constructed of electrical insulation material and including an elongated, axially disposed aperture in which said electrical conductor is disposed, and gas-tight sealing means for preventing the escape of said gaseous insulating medium contained in said arrester housing therefrom, and said monitoring device being coupled between ground potential and said feedthrough coupling member and being disposed on the outside surface of said overload arrester housing, said feedthrough coupling member and said monitoring device forming an integral structural unit extending outwardly through said arrester housing.

2. The switching system recited in claim 1, wherein said monitoring device is spaced apart from said arrester housing, and wherein said coupling member further comprises a coupling conductor to said monitoring device.

3. The switching system recited in claim 1 wherein said sealing means includes an annular gasket disposed about said electrical conductor engaging one end of said body member about said elongated aperture.

4. The switching system recited in claim 3, wherein said monitoring device includes spark gap electrodes disposed in an electrically conductive housing, and wherein said sealing means further includes another annular gasket disposed between said spark gap electrode housing and said body member, and a welded seam, disposed about and joining the base of said spark gap electrode housing to the outer surface of said arrester housing.

* * * * *